(12) United States Patent
Cetiner et al.

(10) Patent No.: US 12,371,188 B2
(45) Date of Patent: Jul. 29, 2025

(54) AERODYNAMIC POD FOR AIRCRAFTS

(71) Applicant: ASELSAN ELEKTRONIK SANAYI VE TICARET ANONIM SIRKETI, Ankara (TR)

(72) Inventors: Abdullah Emre Cetiner, Ankara (TR); Baris Biyik, Ankara (TR); Goktan Guzel, Ankara (TR); Fatih Can, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 18/867,836

(22) PCT Filed: Dec. 19, 2023

(86) PCT No.: PCT/TR2023/051578
§ 371 (c)(1),
(2) Date: Nov. 21, 2024

(87) PCT Pub. No.: WO2024/158362
PCT Pub. Date: Aug. 2, 2024

(65) Prior Publication Data
US 2025/0178744 A1    Jun. 5, 2025

(30) Foreign Application Priority Data
Jan. 27, 2023   (TR) ................. 2023/001006

(51) Int. Cl.
*B64D 47/08* (2006.01)

(52) U.S. Cl.
CPC .................. *B64D 47/08* (2013.01)

(58) Field of Classification Search
CPC ......... B64D 47/08; F16M 13/022; G02B 7/00
See application file for complete search history.

(56) References Cited

U.S. PATENT DOCUMENTS

| | | | |
|---|---|---|---|
| 5,806,789 A * | 9/1998 | Boulware | B64D 47/08 359/223.1 |
| 2016/0090195 A1 | 3/2016 | Blackburn et al. | |
| 2021/0190500 A1* | 6/2021 | Miller | G01C 21/18 |

FOREIGN PATENT DOCUMENTS

| | | |
|---|---|---|
| CN | 201235938 Y | 5/2009 |
| JP | 2016102818 A | 6/2016 |

* cited by examiner

*Primary Examiner* — Valentina Xavier
(74) *Attorney, Agent, or Firm* — Bayramoglu Law Offices LLC

(57) ABSTRACT

An aerodynamic pod for positioning on aircrafts is provided; the aerodynamic pod includes a body and a front body positioned on the body and movable, an optical head positioned on the front body, a rear-view cavity positioned on the front body, a channel opening on the rear-view cavity for movement of the front body against the aerodynamic torque generated thereon, and a protrusion positioned on the rear-view cavity.

14 Claims, 2 Drawing Sheets

AERODYNAMIC POD FOR AIRCRAFTS

CROSS REFERENCE TO THE RELATED APPLICATIONS

This application is the national phase entry of International Application No. PCT/TR2023/051578, filed on Dec. 19, 2023, which is based upon and claims priority to Turkish Patent Application No. 2023/001006, filed on Jan. 27, 2023, the entire contents of which are incorporated herein by reference.

TECHNICAL FIELD

The invention relates to an aerodynamic pod which enables to move an optical apparatus turret positioned on aircrafts while the aircraft is in motion.

BACKGROUND

Optical turrets mounted on optical pods, which are integrated on the aircraft for targeting or surveillance, have the ability to move on the pod and the aircraft to which they are attached. The pods include a body, preferably in the form of a droplet, which is positioned on the air, and a front body that is integrated into the body and can rotate around the centre axis of the body. It includes a spherical head part that carries optical and/or laser systems placed in an opening opened on the front body. The front body and the head part are able to move by means of motors. Further, there is a rear-view cavity on the back of the head part, i.e. the drop-shaped part behind the head part according to the direction of movement of the aircraft. The rear-view cavity has the shape of an opening opened in order to ensure that the angle of view is not restricted by the body when the head part, which can move circularly between 0-120 degrees, rotates 120 degrees.

In order for the front body to be able to move around its own axis due to the air flow generated while the aircraft is in motion and to counter the aerodynamic torque generated, heavy and high energy consumption power units are required. This situation affects the performance and fuel consumption of aircrafts where each weight is of great importance. When small power units with low energy consumption are used, the front body cannot perform a complete movement between 0-360 degrees, especially around the centre axis of the body, since it cannot resist the aerodynamic torque.

U.S. Pat. No. 5,806,789 describes an optical pod for planes. The aerodynamic flow and turbulence on the rear part of the circular tracking pod, which is developed to expand the field of view by rotating the head of the pod towards the rear, reduces the quality of the optical path. In the prior art, it is mentioned that air separators are placed behind the circular optical turret to solve this problem and to improve the image quality by ensuring that the strehl ratio is close to 1. However, the prior art does not provide a solution for rotating the front body against the aerodynamic torque with lightweight and low energy consumption power units.

Therefore, in the prior art, an aerodynamic pod is needed to counteract the aerodynamic torque, allowing it to be driven by lightweight and low energy consumption power units.

SUMMARY

The purpose of the invention is to realise an aerodynamic pod which enables the body carrying optical and/or laser systems to be able to move against aerodynamic torque.

Another purpose of the present invention is to realise an aerodynamic pod which provides light weight and low energy consumption on the aircraft.

An aerodynamic pod as defined in the first claim and the dependent claims of the invention for the achievement of the purpose of the present invention, comprises by being positioned on aircrafts; an aerodynamic pod movable against aerodynamic torque, a body and a front body comprising arms extending from and positioned on the body, an optical head, preferably in the form of an almost partially sphere, positioned between the arms and movable between the arms with the x-axis as its centre a rear-view cavity positioned on the front body.

It comprises a channel opening on the rear-view cavity and a protrusion positioned on the rear-view cavity for circular movement around the y-axis, which is the centre axis of the body, against the aerodynamic torque generated on the front body. In other words, while the aircraft is in motion, a protrusion and a channel are positioned on the rear-view cavity in order to regulate the asymmetric pressure distribution on the rear-view cavity and to reduce the aerodynamic torque on the front body, so that the front body can rotate circularly around the y-axis. By reducing the amount of torque, the energy required by the power unit to move the front body is reduced and power units with smaller dimensions and weight are used to move the front body compared to aerodynamic pods without a protrusion and a channel on the rear-view cavity. In other words, the amount of torque required to move the front body around the y-axis is reduced by about 40 percent with the presence of a protrusion and a channel on the rear-view cavity.

BRIEF DESCRIPTION OF THE DRAWINGS

The aerodynamic pod performed to achieve the object of the present invention is shown in the accompanying figure (s).

Figure 1:
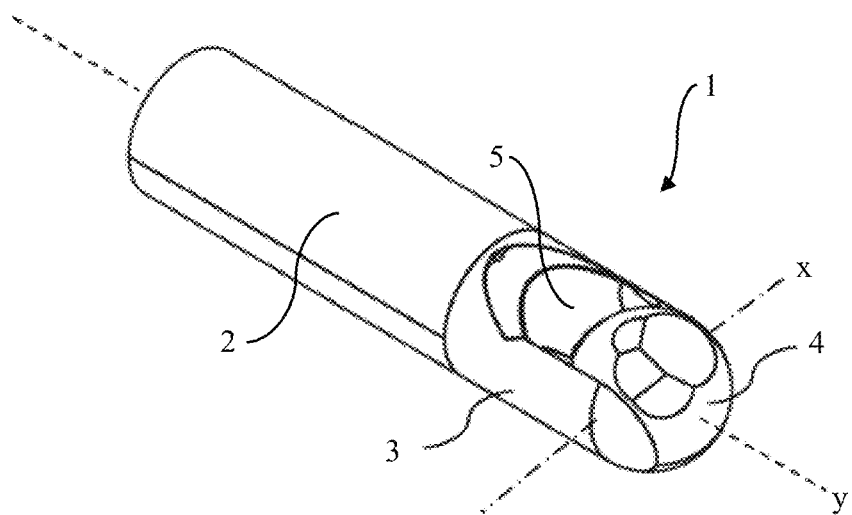
FIG. 1 is perspective view of the prior art aerodynamic pod.
Figure 2:
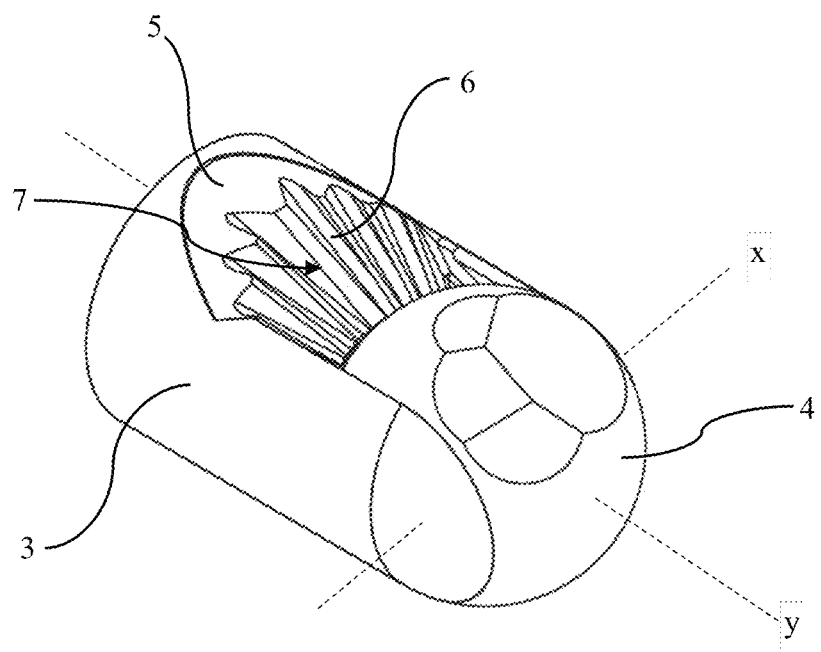
FIG. 2 is perspective view of the front body.
Figure 3:
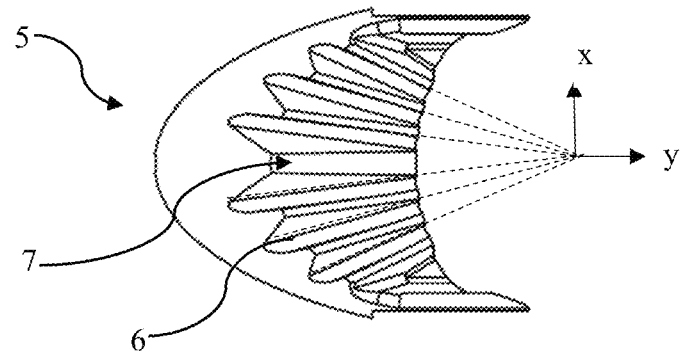
FIG. 3 is top view of the rear-view cavity.

The parts in the figures are numbered one by one and the equivalents of these numbers are given below.

1. Aerodynamic pod
2. Body
3. Front body
4. Optical head
5. Rear-view cavity
6. Channel
7. Protrusion
x. x axis
y. y axis

DETAILED DESCRIPTION OF THE EMBODIMENTS

An aerodynamic pod (1) positioned on the aircrafts and movable against aerodynamic torque, comprises a body (2) and a front body (3) positioned on the body (2) and comprising arms extending therefrom, an optical head (4) preferably in the form of an almost partially sphere positioned between the arms and movable between the arms with the x-axis (x) as its centre, a rear-view cavity (5) positioned on the front body (3).

It comprises a channel (6) opening on the rear-view cavity (5) and a protrusion (7) positioned on the rear-view cavity (5) for circular movement around the y-axis (y), which is the centre axis of the body (2), against the aerodynamic torque formed on the front body (3). In other words, while the aircraft is in motion, the air circulating around the optical head (4), a protrusion (7) and a channel (6) are positioned on the rear-view cavity (5) to regulate the asymmetric pressure distribution on the rear-view cavity (5) and to reduce the aerodynamic torque on the front body (3), so that the front body (3) can rotate circularly around the y-axis (y). By reducing the amount of torque, the energy required by the power unit to move the front body (3) is reduced, and the use of power units with smaller dimensions and weight compared to aerodynamic pods (1) without a protrusion (7) and a channel (6) on the rear-view cavity (5) can be used to move the front body (3). In other words, the amount of torque required to move the front body (3) around the y-axis (y) is reduced by about 40% by means of a protrusion (7) and a channel (6) on the rear-view cavity (5).

In one embodiment of the invention, the channel (6) on the rear-view cavity (5) is opened so as to pass over an axis line formed so as to extend towards the y-axis (y). In one embodiment of the invention, a plurality of channels (6) are opened on the rear-view cavity (5) so as to pass over an axis line formed so as to extend towards the y-axis (y). Thus, while the aircraft is in motion, the air circulating around the optical head (4) regulates the asymmetric pressure distribution formed on the rear-view cavity (5) and directs the aerodynamic pressure on the front body (3) linearly to the y-axis (y). With the aerodynamic pressure directed linearly to the y-axis (y), the torque on the front body (3) is almost partially 0 N.m., which enables the front body (3) to move circularly around the y-axis (y). Further, some of the flow circulating around the optical head (4) is thrown out of the rear-view cavity (5) with the help of the channel (6) to remove it from the surfaces of the rear-view cavity (5), and the flow that cannot be thrown out of the rear-view cavity (5) is directed to the y-axis (y), allowing the front body (3) to move circularly around the y-axis (y).

In one embodiment of the invention, the channel (6) on the rear-view cavity (5) is positioned so as to pass over an axis line formed so as to pass through the intersection point of the x-axis (x) and the y-axis (y). The intersection point of the x-axis (x) and y-axis (y) is usually the centre point of the optical head (4), and the air contacting the optical head (4) circulates around the optical head (4) and contacts the rear-view cavity (5). In order for the aforementioned air to enter the rear-view cavity (5) in a linear manner and exit in a linear manner, a channel (6) is opened to pass over an axis line formed to pass through the intersection point of the x-axis (x) and the y-axis (y), and thus, while the aircraft is in motion, the air circulating around the optical head (4) regulates the asymmetric pressure distribution formed over the rear-view cavity (5), and the aerodynamic pressure on the front body (3) is directed linearly to the y-axis (y). By means of the extension of the x-axis (x), it allows laminar movement of the air around the optical head (4). The aerodynamic pressure directed linearly to the y-axis (y) and the torque on the front body (3) are almost partially 0 N.m., and thus allowing the front body (3) to move circularly around the y-axis (y).

In one embodiment of the invention, the protrusion (7) on the rear-view cavity (5) is formed so as to pass over an axis line formed so as to extend towards the y-axis (y). In one embodiment of the invention, a plurality of protrusions (7) are positioned on the rear-view cavity (5) so as to pass over an axis line formed so as to extend towards the y-axis (y). In this way, while the aircraft is in motion, the air circulating around the optical head (4) regulates the asymmetrical pressure distribution on the rear-view cavity (5), directing the aerodynamic pressure on the front body (3) linearly towards the y-axis (y). The aerodynamic pressure directed linearly to the y-axis (y) and the torque on the front body (3) are almost partially 0 N.m., and thus allowing the front body (3) to move circularly around the y-axis (y). Further, some of the flow circulating around the optical head (4) is thrown out of the rear-view cavity (5) by means of the protrusion (7) in order to remove it from the surfaces of the rear-view cavity (5), and the flow that cannot be thrown out of the rear-view cavity (5) is directed to the y-axis (y), thereby allowing the front body (3) to move circularly around the y-axis (y).

In one embodiment of the invention, the protrusion (7) on the rear-view cavity (5) is positioned to pass over an axis line formed to pass through the intersection point of the x-axis (x) and the y-axis (y). The intersection point of the x-axis (x) and y-axis (y) is usually the centre point of the optical head (4), and the air contacting the optical head (4) circulates around the optical head (4) and contacts the rear-view cavity (5). In order for the aforementioned air to enter the rear-view cavity (5) in a linear manner and exit in a linear manner, the protrusion (7) is opened to pass over an axis line formed to pass through the intersection of the x-axis (x) and the y-axis (y) and the asymmetric pressure distribution on the front body (3) is regulated, thereby the air circulating around the optical head (4) is directed to the aerodynamic pressure on the rear-view cavity (5) linearly to the y-axis (y) while the aircraft is in motion. By means of the extension of the x-axis (x), it allows laminar movement of the air around the optical head (4). The aerodynamic pressure directed linearly to the y-axis (y) and the torque on the front body (3) is almost partially 0 N.m., and thus allowing the front body (3) to move circularly around the y-axis (y).

In one embodiment of the invention, an optical head (4) is provided which is substantially partially spherical. Due to the almost partially spherical shape of the optical head (4), it is possible to ensure that the air circulating around the optical head (4) is laminar and then travelling laminarly over the channel (6) and the protrusion (7) in the rear-view cavity (5). In one embodiment of the invention, the optical head (4) may be of any form, such as cylindrical or drop-shaped.

Figure 4:
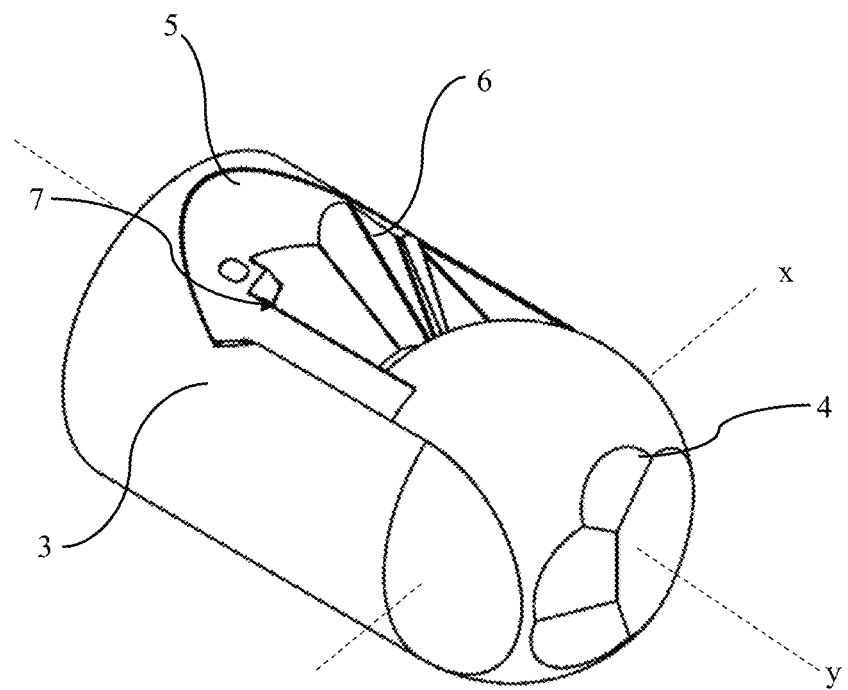
FIG. 4 is perspective view of an embodiment of the rear-view cavity on the front body.

In one embodiment of the invention, each channel (6) and protrusion (7) positioned on the rear-view cavity (5) is positioned to pass over a line formed to intersect the y-axis (y). Each channel (6) and protrusion (7) positioned on the rear-view cavity (5) has a different shape and form (FIG. 4). The different shapes of the channel (6) and protrusion (7) provide optimum air flow depending on the shape of the optical head (4).

What is claimed is:

1. An aerodynamic pod for positioning on an aircraft, comprising a body, a movable front body positioned on the body, an optical head positioned on the movable front body, and a rear-view cavity positioned on the movable front body, wherein
   a channel opening on the rear-view cavity and a protrusion positioned on the rear-view cavity are configured for moving against an aerodynamic torque generated thereon.

2. The aerodynamic pod according to claim 1, wherein the protrusion is formed on the rear-view cavity to pass over an axis line formed to extend towards y-axis.

3. The aerodynamic pod according to claim 1, wherein the channel is formed on the rear-view cavity to pass over an axis line formed to extend towards y-axis.

4. The aerodynamic pod according to claim 1, wherein the channel is cut into the rear-view cavity to pass over an axis line formed to pass through an intersection of x-axis and y-axis.

5. The aerodynamic pod according to claim 1, wherein the protrusion is positioned on the rear-view cavity so as to pass over an axis line formed to pass through an intersection of x-axis and y-axis.

6. The aerodynamic pod according to claim 1, wherein the optical head has a substantially partially spherical shape.

7. The aerodynamic pod according to claim 2, wherein the channel is formed on the rear-view cavity to pass over the axis line formed to extend towards the y-axis.

8. The aerodynamic pod according to claim 4, wherein the protrusion is positioned on the rear-view cavity to pass over the axis line formed to pass through the intersection of the x-axis and the y-axis.

9. The aerodynamic pod according to claim 2, wherein the optical head has a substantially partially spherical shape.

10. The aerodynamic pod according to claim 3, wherein the optical head has a substantially partially spherical shape.

11. The aerodynamic pod according to claim 4, wherein the optical head has a substantially partially spherical shape.

12. The aerodynamic pod according to claim 5, wherein the optical head has a substantially partially spherical shape.

13. The aerodynamic pod according to claim 7, wherein the optical head has a substantially partially spherical shape.

14. The aerodynamic pod according to claim 8, wherein the optical head has a substantially partially spherical shape.

\* \* \* \* \*